UNITED STATES PATENT OFFICE.

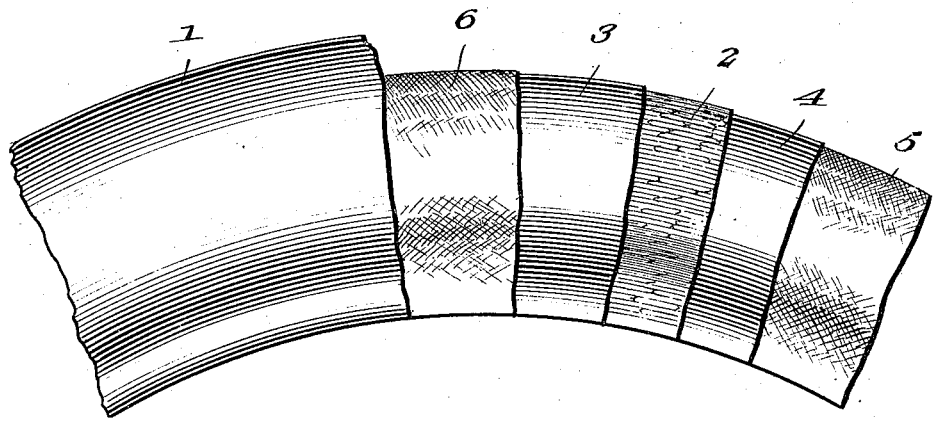
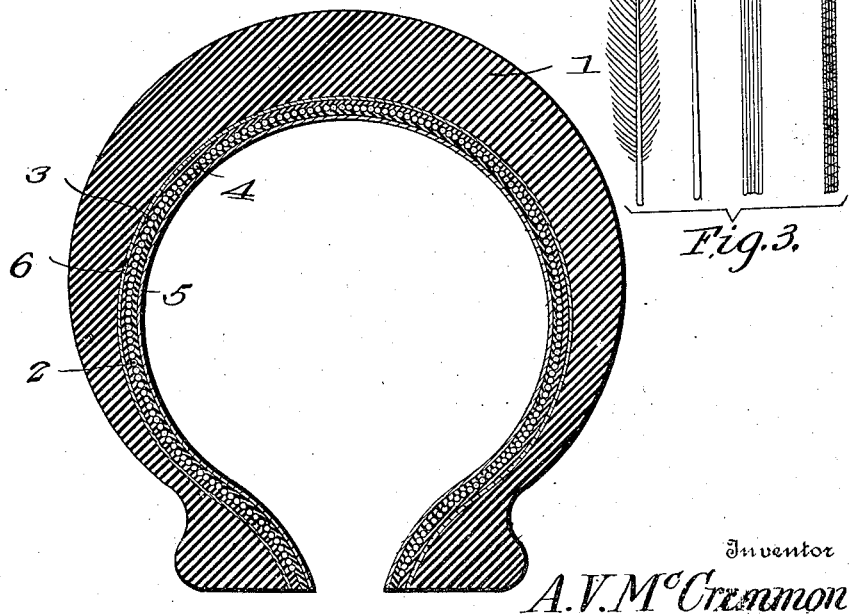

ALEXANDER V. McCRIMMON, OF BEATRICE, NEBRASKA.

ARMOR FOR PNEUMATIC TIRES.

1,218,431.   Specification of Letters Patent.   Patented Mar. 6, 1917.

Application filed December 15, 1914. Serial No. 877,411.

*To all whom it may concern:*

Be it known that I, ALEXANDER V. MCCRIMMON, a citizen of the United States, residing at Beatrice, in the county of Gage and State of Nebraska, have invented new and useful Improvements in Armors for Pneumatic Tires, of which the following is a specification.

This invention relates to armors for pneumatic tires, the object in view being to provide an inside lining or armor for the outer casings or shoes of pneumatic tires which will practically resist punctures and blow outs without materially increasing the weight of the tire, the same armor or lining embodying a novel combination of elements producing a tough and light-weight obstruction which also acts to reinforce and strengthen the outer casing of the tire.

With the above and other objects in view, the invention consists in the novel construction, combination and arrangement of parts, as herein described, illustrated and claimed.

In the accompanying drawings:—

Figure 1 is a side elevation partly in section of a tire embodying the present invention.

Fig. 2 is an enlarged cross section through the same.

Fig. 3 illustrates the several steps in utilizing the feathers of fowls and forming the same into a sheet or layer of quills.

Referring to the drawings A generally designates the outer casing or shoe of a pneumatic tire body 1 which is usually composed of rubber or rubber and textile material combined and vulcanized together.

The armor or lining of this invention embodies a layer of quills designated at 2, said quills being such as those taken from the feathers of chickens, turkeys or other fowls, the quills being substantially round in cross section and laid close together in parallel relation so as to extend side by side longitudinally of the tire.

On the outer and inner sides of the layer of quills 2 there are plies 3 and 4 of rubber which are vulcanized together around the quills so as to securely anchor the quills therein and prevent any possibility of relative shifting movement between the quills when nails, tacks and other sharp pointed objects come in contact therewith.

In assembling the quills they are secured together by stitching the same close together or passing thread or twine back and forth around the same so as to produce a sheet of quills. The plies of rubber are then placed on opposite sides of the sheet of quills and after the canvas plies have been assembled, the whole armor is vulcanized in the usual way.

In the preferred embodiment of the invention, an inside ply 5 of canvas, duck or other textile material is applied and cemented or vulcanized to the inner ply 4 of rubber and an outside ply 6 of material similar to the ply 5 is applied and cemented or vulcanized to the outer rubber ply 3. The complete armor or lining thus formed, is applied to the inside of the body 1 of a pneumatic tire outer casing to which the said armor may be vulcanized or otherwise cemented or fastened in any desired way. The construction above described results in the formation of an unusually tough outer armor of such strength as to practically resist all blow outs and prevent puncture to a marked degree. Furthermore, the armor is exceedingly light on account of the use of the quills and materially adds to the life and wearing qualities of the tire as a whole.

I claim:

Armor for pneumatic tires embodying in combination, outer and inner plies of rubber, and an interposed layer of quills which extend longitudinally of the tire and are arranged close together and parallel to each other, said quills being substantially round in cross section and laced together by threads interwoven therewith, the whole being vulcanized to form an armor sheet.

In testimony whereof I affix my signature in presence of two witnesses.

ALEXANDER V. McCRIMMON.

Witnesses:
 HAROLD M. ROFF,
 ERNST SCHUEKEL, Jr.